(12) United States Patent
Long (10) Patent No.: US 12,434,754 B2
(45) Date of Patent: Oct. 7, 2025

(54) CASTER WHEEL BRAKE SYSTEM

(71) Applicant: Pipp Mobile Storage Systems, Inc., Walker, MI (US)

(72) Inventor: Matthew M. Long, Lakemoor, IL (US)

(73) Assignee: Pipp Mobile Storage Systems, Inc., Walker, MI (US)

( * ) Notice: Subject to any disclaimer, the term of this patent is extended or adjusted under 35 U.S.C. 154(b) by 492 days.

(21) Appl. No.: 17/747,559

(22) Filed: May 18, 2022

(65) Prior Publication Data

US 2022/0371640 A1 Nov. 24, 2022

Related U.S. Application Data

(60) Provisional application No. 63/189,929, filed on May 18, 2021.

(51) Int. Cl.
*B62B 5/04* (2006.01)
*B60B 33/00* (2006.01)
*F16D 65/28* (2006.01)

(52) U.S. Cl.
CPC ........ *B62B 5/0438* (2013.01); *B60B 33/0015* (2013.01); *B60B 33/0078* (2013.01); *F16D 65/28* (2013.01)

(58) Field of Classification Search
CPC .............. B62B 5/0438; B62B 5/0447; B60B 33/0078; B60B 33/0081; B60B 33/0086; F16D 65/28
USPC .............. 188/1.12, 19, 21; 280/47.34, 47.35, 280/47.371
See application file for complete search history.

(56) References Cited

U.S. PATENT DOCUMENTS

| | | | | |
|---|---|---|---|---|
| 607,329 A | * | 7/1898 | Beebe | B66F 7/246 188/21 |
| 1,559,796 A | * | 11/1925 | Shuey | B62B 5/04 188/106 R |
| 2,262,433 A | | 11/1941 | Uecker | |
| 2,417,694 A | * | 3/1947 | Larsson | B61H 11/02 188/149 |
| 2,709,828 A | | 6/1955 | Noelting | |
| 3,409,105 A | | 11/1968 | Clinton | |
| 3,571,842 A | | 3/1971 | Fricke | |

(Continued)

FOREIGN PATENT DOCUMENTS

| | | |
|---|---|---|
| DE | 19516586 | 11/1996 |
| DE | 102010051099 | 11/2011 |

(Continued)

*Primary Examiner* — Thomas J Williams
(74) *Attorney, Agent, or Firm* — Gardner, Linn, Burkhart & Ondersma LLP (57) ABSTRACT

A caster wheel brake system for a mobile support system such as a cart or other wheeled structure is operable to selectively secure caster wheels against rolling rotation. The system includes a caster wheel assembly and a braking mechanism mounted nearby. A pair of brake actuation inputs, such as handles or levers, can be secured to the cart and independently operated to rotate a rotator link, which in turn rotates a brake-actuating link. Rotation of the brake-actuating link deactivates the braking mechanism to allow rolling rotation of the caster wheels. Optionally, the operation of one of the handles to deactivate the braking mechanism has no effect on the other handle.

21 Claims, 7 Drawing Sheets

(56) References Cited

U.S. PATENT DOCUMENTS

| | | | |
|---|---|---|---|
| 3,701,396 A * | 10/1972 | House | B62B 5/049 |
| | | | 188/32 |
| 3,828,392 A | 8/1974 | Bolger | |
| 3,840,242 A | 10/1974 | Craig, Sr. et al. | |
| 3,881,216 A | 5/1975 | Fontana | |
| 3,911,525 A | 10/1975 | Haussels | |
| 4,066,151 A * | 1/1978 | Liebscher | B60T 1/14 |
| | | | 188/167 |
| 4,205,413 A | 6/1980 | Collignon | |
| 4,248,445 A | 2/1981 | Vassar | |
| 4,526,253 A * | 7/1985 | Schmidt | B60B 33/021 |
| | | | 188/29 |
| 5,139,116 A | 8/1992 | Screen | |
| 5,170,529 A | 12/1992 | Kovacs | |
| 5,579,871 A * | 12/1996 | Emmrich | B60B 33/026 |
| | | | 188/19 |
| 5,634,532 A * | 6/1997 | Bucher | B62B 5/04 |
| | | | 188/74 |
| 5,979,917 A * | 11/1999 | Thogersen | B60B 33/0086 |
| | | | 280/47.35 |
| 6,219,881 B1 | 4/2001 | Wen | |
| 6,237,726 B1 | 5/2001 | Otterson et al. | |
| 6,662,404 B1 | 12/2003 | Stroh et al. | |
| 7,011,317 B1 | 3/2006 | Hicks et al. | |
| 7,213,816 B2 | 5/2007 | Gregory et al. | |
| 7,320,472 B2 | 1/2008 | Gregory et al. | |
| 7,406,989 B1 | 8/2008 | Casaus | |
| 8,024,101 B2 * | 9/2011 | Froli | B60B 33/0081 |
| | | | 701/1 |
| 8,397,345 B2 | 3/2013 | Von Bordelius et al. | |
| 8,484,802 B1 | 7/2013 | Lin | |
| 8,516,656 B2 | 8/2013 | Lin | |
| 8,973,217 B2 | 3/2015 | Weichbrodt | |
| 11,324,648 B2 | 5/2022 | Van Loon | |
| 2004/0041462 A1 | 3/2004 | Hicks | |
| 2005/0023787 A1 * | 2/2005 | Haynes | B62B 3/002 |
| | | | 280/79.11 |
| 2006/0131110 A1 | 6/2006 | Chung | |
| 2007/0216117 A1 | 9/2007 | Figel | |
| 2008/0120810 A1 | 5/2008 | Reckelhoff | |
| 2011/0107554 A1 | 5/2011 | Minowa | |
| 2011/0119864 A1 | 5/2011 | Minowa | |
| 2012/0160617 A1 * | 6/2012 | Qi | B60T 1/04 |
| | | | 188/1.12 |
| 2013/0111664 A1 | 5/2013 | Childs | |
| 2015/0210114 A1 | 7/2015 | Spektor | |
| 2019/0358998 A1 | 11/2019 | Patmore | |
| 2022/0297475 A1 | 9/2022 | Long | |
| 2022/0371640 A1 * | 11/2022 | Long | B60B 33/0078 |

FOREIGN PATENT DOCUMENTS

| | | |
|---|---|---|
| DE | 202013009346 | 1/2015 |
| DE | 202013010367 | 2/2015 |
| DE | 102013110134 | 4/2015 |
| DE | 202014003033 | 7/2015 |
| DE | 202016100180 | 2/2016 |
| DE | 202015107054 | 5/2016 |
| DE | 202016103086 | 8/2016 |
| DE | 202015103436 | 10/2016 |
| DE | 202016103756 | 10/2016 |
| DE | 202016106442 | 11/2016 |
| DE | 102019123213 | 12/2020 |
| EP | 2669143 | 12/2013 |
| ES | 2588163 | 10/2016 |
| JP | 11227407 | 8/1999 |
| JP | 2000052704 | 2/2000 |
| JP | 2002264604 | 9/2002 |

* cited by examiner

CASTER WHEEL BRAKE SYSTEM

CROSS REFERENCE TO RELATED APPLICATION

The present application claims the benefit of U.S. provisional application Ser. No. 63/189,929, filed on May 18, 2021, which is hereby incorporated herein by reference in its entirety.

FIELD OF THE INVENTION

This invention relates in general to a wheel brake system for carts and the like.

BACKGROUND OF THE INVENTION

Casters are used to support and move various equipment or structures that broadly include any implement on at least one wheel that is typically moved by manual force, such as a push cart, a wheelchair, or a wheeled bed frame. Caster systems can include one or more wheels and are employed to facilitate moving a structure to which the casters are mounted or attached. It may be desirable to selectively prevent wheels from rolling, such as when the associated cart or structure is positioned on an incline, or when any inadvertent movement of the structure could damage the structure or other objects or surfaces, or create a safety hazard.

SUMMARY OF THE INVENTION

The present invention provides a caster wheel brake system for use on carts and similar wheeled structures or mobile support devices. The brake system can be actuated by an operator from either opposite end of the cart or wheeled structure. A caster wheel assembly includes two caster wheels, each in a default state of being braked, which may be simultaneously released from the braking state ("released" or "unbraked") using the system. It is envisioned that independently actuatable handles may be provided at opposite ends of the cart, and either one used to set or release a brake. Moreover, actuation of one handle does not necessarily cause the other handle to move, which allows the cart to be placed with a first handle in close proximity with a wall, another cart, or other object, and the brake set or released using a second (opposite) handle without causing the first handle to move into contact with the wall or other object. Additionally, one handle can be entirely immobilized by articles carried by the cart on one side, and by a wall or other objects on the other side, without affecting the function of the other handle. This allows carts equipped with the caster wheel brake system to be moved and braked as desired by an operator at one end of the cart, and further permits loading of the cart and placement of the cart in close proximity to other objects or obstructions, without affecting access to at least one handle for operation of the brake.

In one form of the present invention, a caster wheel brake system is provided for a push cart or other mobile support or wheeled structures, and allows an operator to brake and unbrake one or more caster wheels against rolling movement. The system includes first and second handles coupled to a rotator link, where each handle can be moved from a respective locking position to a respective unlocking position to rotate the rotator link in a disengagement direction. Rotation of the rotator link in this manner causes a brake-actuating link to also rotate in the disengagement direction to release a brake coupled to a wheel. Releasing the brake allows the wheel to roll.

According to one aspect, the handles are coupled to opposing sides of the mobile support.

According to another aspect, either handle can be independently moved from its respective locking position to its respective unlocking position without moving the other handle.

According to yet another aspect, the caster wheel brake system includes first and second slotted links that each define a slot, and that couple the first and second handles to the rotator link. When the first handle is moved from its locking position to its unlocking position, a portion of the rotator link slides within the second slotted link's slot while another portion of the rotator link does not slide within the first slotted link's slot. When the second handle is moved from its locking position to its unlocking position, a portion of the rotator link slides within the first slotted link's slot while another portion of the rotator link does not slide within the second slotted link's slot.

According to still another aspect, the rotator link includes fork linkages that are coupled the handles.

According to yet another aspect, the caster wheel brake system includes a resilient member that exerts a biasing force on the brake-actuating link in a direction opposite the disengagement direction.

According to a further aspect, the first handle pivots about a vertical axis between its locking and unlocking positions, and the second handle pivots about a horizontal axis between its locking and unlocking positions.

According to still a further aspect, the handles are coupled to upright outer sides of the mobile support. While in their respective locking positions, each handle is oriented parallel to a respective upright outer side, and may optionally be coplanar with the respective upright outer side.

According to another form of the present invention, a caster wheel brake system is provided for a push cart or other mobile support or wheeled structures, and allows a user to brake and unbrake one or more caster wheels against rolling movement. The system includes first and second handles that are independently operable to move from a respective locking position to a respective unlocking position without affecting the other handle. The first handle is coupled to a longitudinal brake rod, and the second handle coupled to a vertical brake rod, where each brake rod is coupled to a rotator link. The first handle can be moved from its locked position to its unlocked position to move the longitudinal brake rod in a longitudinal direction to rotate the rotator link in a disengagement direction. The second handle can be moved from its locked position to its unlocked position to move the vertical brake rod in a vertical direction to rotate the rotator link in the disengagement direction. Rotation of the rotator link in this manner causes a brake-actuating link to also rotate in the disengagement direction to release a brake coupled to a wheel. Releasing the brake allows the wheel to roll.

In one aspect, the longitudinal brake rod includes a proximal brake rod and a distal brake rod that are coupled together by a center support arm that is pivotably connected to the mobile support.

In another aspect, the caster wheel brake system includes a pair of slotted links that each define a slot and that slidably couple the brake rods to the rotator link.

These and other objects, advantages, purposes and features of the present invention will become apparent upon review of the following specification in conjunction with the drawings.

DETAILED DESCRIPTION OF PREFERRED EMBODIMENTS

Referring now to the drawings and the illustrative embodiments, in particular FIGS. 1-3, a push cart 20 is provided with a caster wheel brake system 22 that allows a user to selectively brake and unbrake a pair of non-swiveling caster wheels 24 against rolling motion, as will be described in more detail below. A pair of swiveling caster wheels 26 support an opposite end of push cart 20, which is representative of substantially any mobile support or mobile storage device that is used to support articles for transport, typically within a facility such as a warehouse, factory, retail store, or the like. Push cart 20 is manually movable by an individual operator, although in some cases a push cart may be self-powered and controlled by the operator. Caster wheel brake system 22 provides first and second brake handles 28, 30 at opposing ends of cart 20, either of which may be moved independently of one another between respective locking and unlocking positions to brake and unbrake wheels 24 against rolling motion without moving or affecting the unused handle. In this way, brake system 22 provides improved spatial efficiency and flexibility to park and move cart 20 in various spaces as desired, unlike more traditional brake systems that may only have a single braking input, or multiple braking inputs that affect one another.

Figure 1:
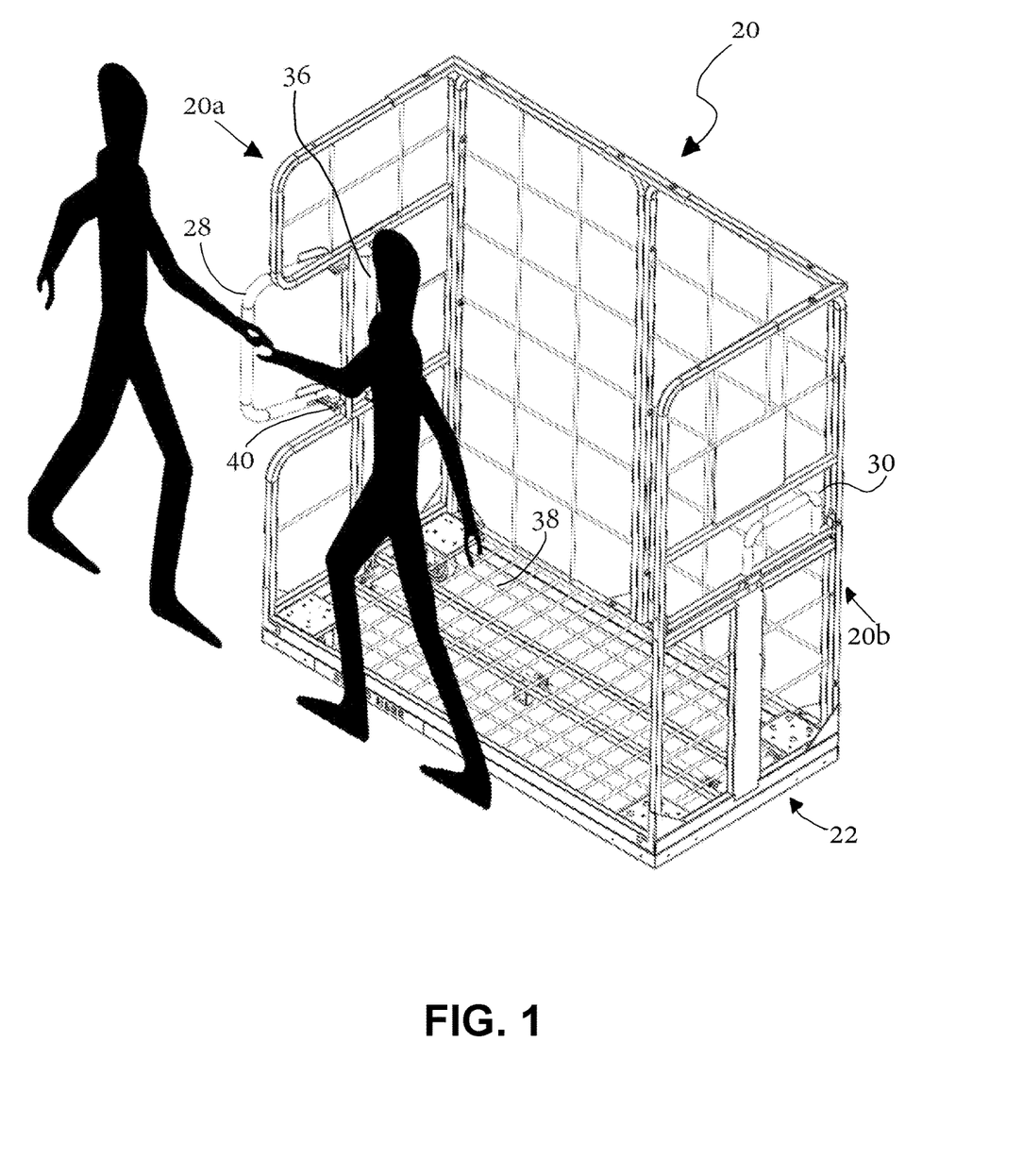
FIG. 1 is a top perspective view of a cart fitted with a caster wheel brake system in accordance with the present invention, depicted with two different operators in different locations for operation of one brake handle.
Figure 2:
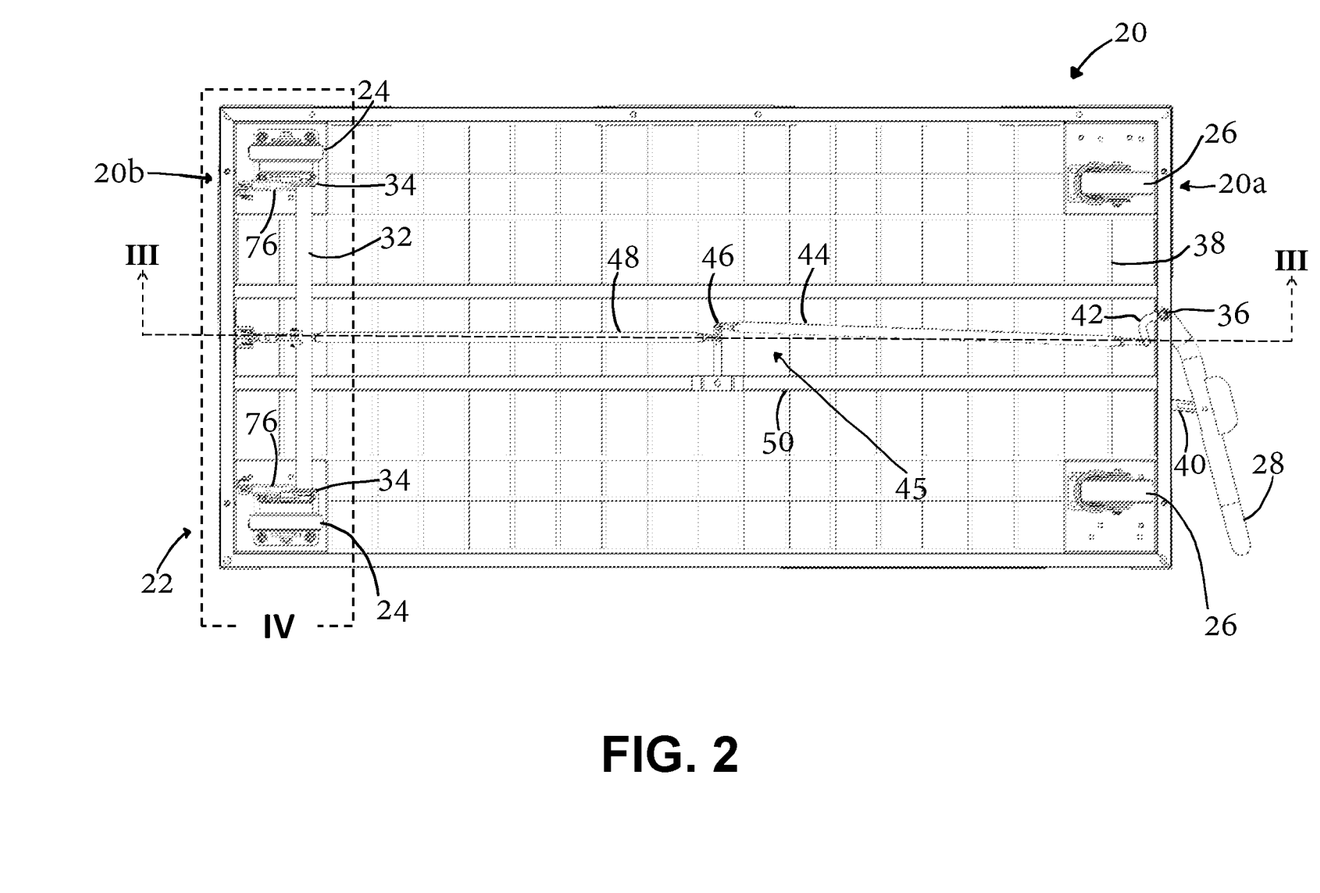
FIG. 2 is a bottom plan view of the cart with the caster wheel brake system of FIG. 1.
Figure 3:
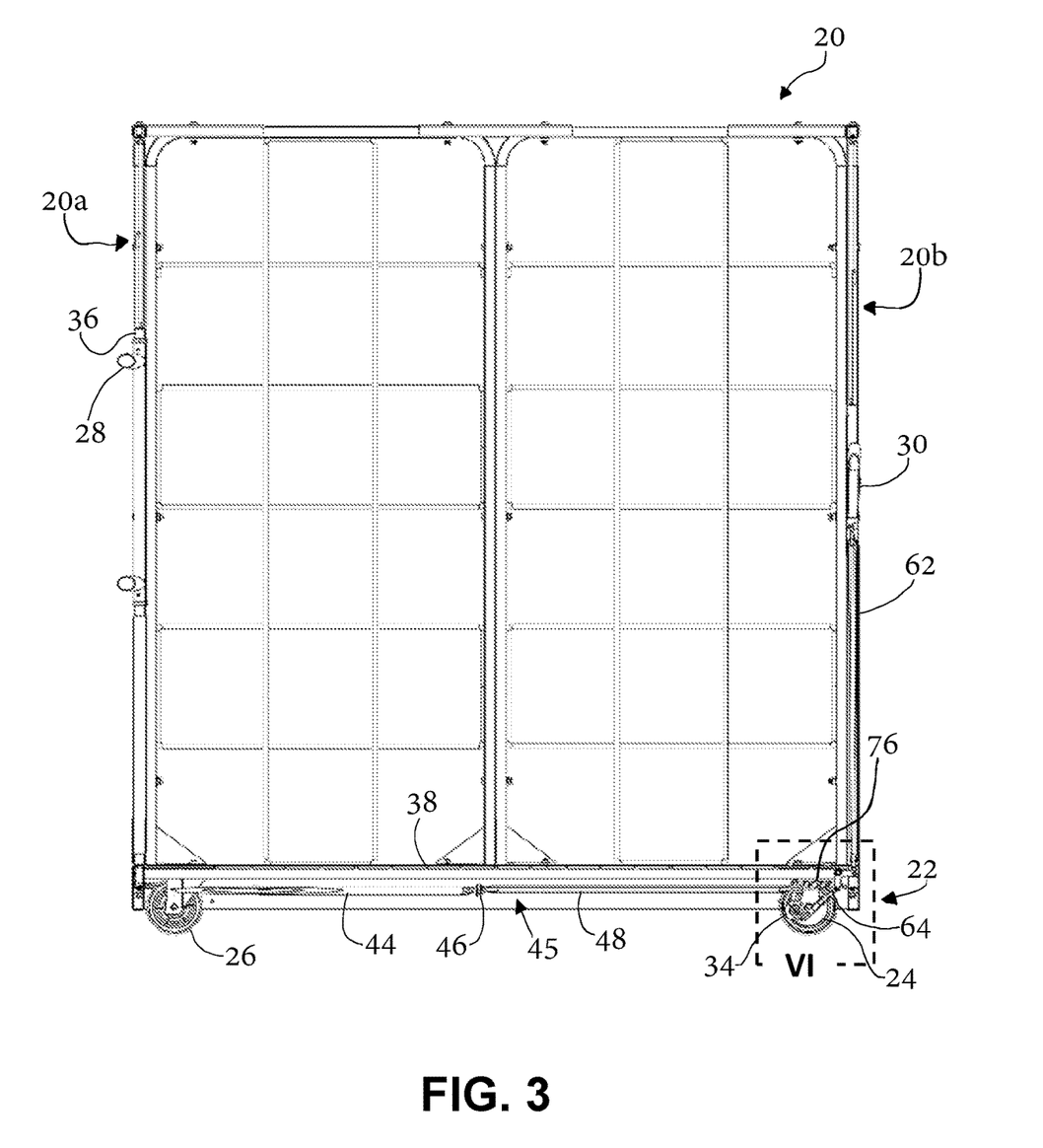
FIG. 3 is a side elevation view of the cart with the caster wheel brake system taken along Section III-III of FIG. 2.
Figure 4:
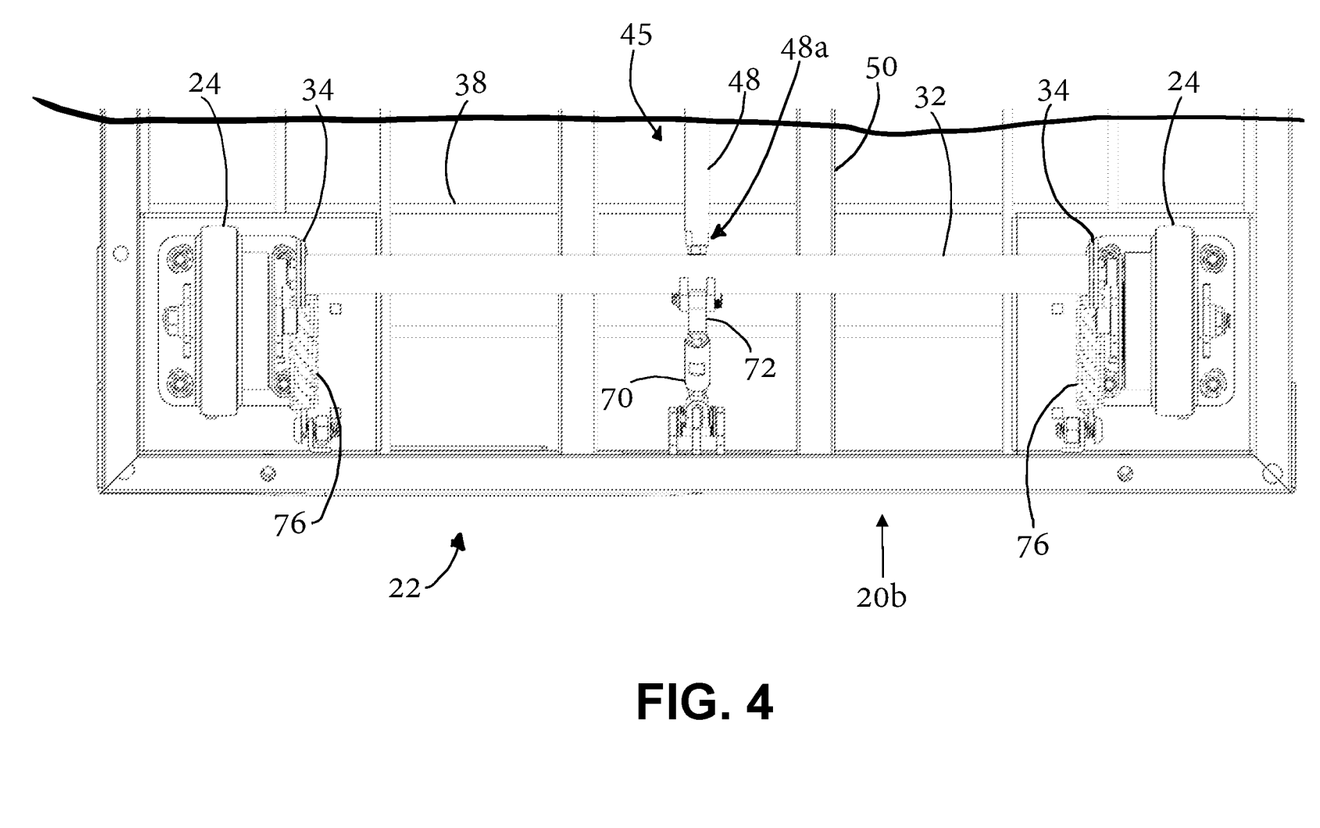
FIG. 4 is an enlarged view of the area designated IV in FIG. 2.

Caster wheel brake system 22 includes brake actuation inputs in the form of first brake handle 28 that pivots about a vertical axis, and second brake handle 30 that pivots about a horizontal axis, which handles are secured to opposing upright outer side walls 20a, 20b of cart 20, as shown in FIGS. 1-3. Either brake handle 28, 30 can be used independently to rotate a brake-actuating link, such as brake tube 32 that extends between wheels 24. Opposite ends of brake tube 32 are fitted with respective actuation flanges 34. Rotation of brake tube 32 in a disengagement direction (counterclockwise as viewed in FIG. 6) rotates actuation flanges 34 to disengage a braking mechanism such as brake pads inside wheels 24 and allows the wheels to roll. Optionally, frictional resistance to wheel rotation may be proportional to the actuation of either brake handle 28, 30 for purposes of slowing cart 20 during movement. The brake system could be configured so that actuation of either brake handle 28, 30 engages a braking mechanism to brake, lock, and/or apply resistance to rotation of wheels 24 against rolling motion.

First brake handle 28 is pivotably secured to upright outer side wall 20a of cart 20, and is connected to a vertical lever post 36 that extends downwardly beneath a steel-mesh cargo surface 38, such as shown in FIGS. 1 and 3. Handle 28 can be rotated about a longitudinal and vertical axis of post 36 from a locking position in which handle 28 is coplanar with side wall 20a of cart 20, to an unlocking position (shown in FIGS. 1 and 2) to release brake system 22. A cable, link, or bar 40 connected between handle 28 and push cart 20 limits the maximum degree of rotation by handle 28 to prevent excessive manual loads from being applied on brake system 22. Rotation of handle 28 in the above-described manner rotates post 36 about its longitudinal axis. As shown in FIG. 2, a hook-shaped coupling link 42 located beneath cargo surface 38 translates the rotational motion of post 36 into the linear retraction of a longitudinal brake rod 45, which includes a proximal brake rod 44 connected to a distal brake rod 48 by a center support coupling 46. The retracting motion of proximal brake rod 44 in response to the motion of hook-shaped coupling link 42 pivots center support arm coupling 46 to also retract distal brake rod 48. Center support arm coupling 46 provides additional support to brake rods 44, 48, and is pivotably mounted to a cargo support brace 50 that provides additional support to cargo surface 38. It should be appreciated that an alternative embodiment could include a single longitudinal brake rod in place of proximal brake rod 44, center support arm coupling 46, and distal brake rod 48.

Figure 5:
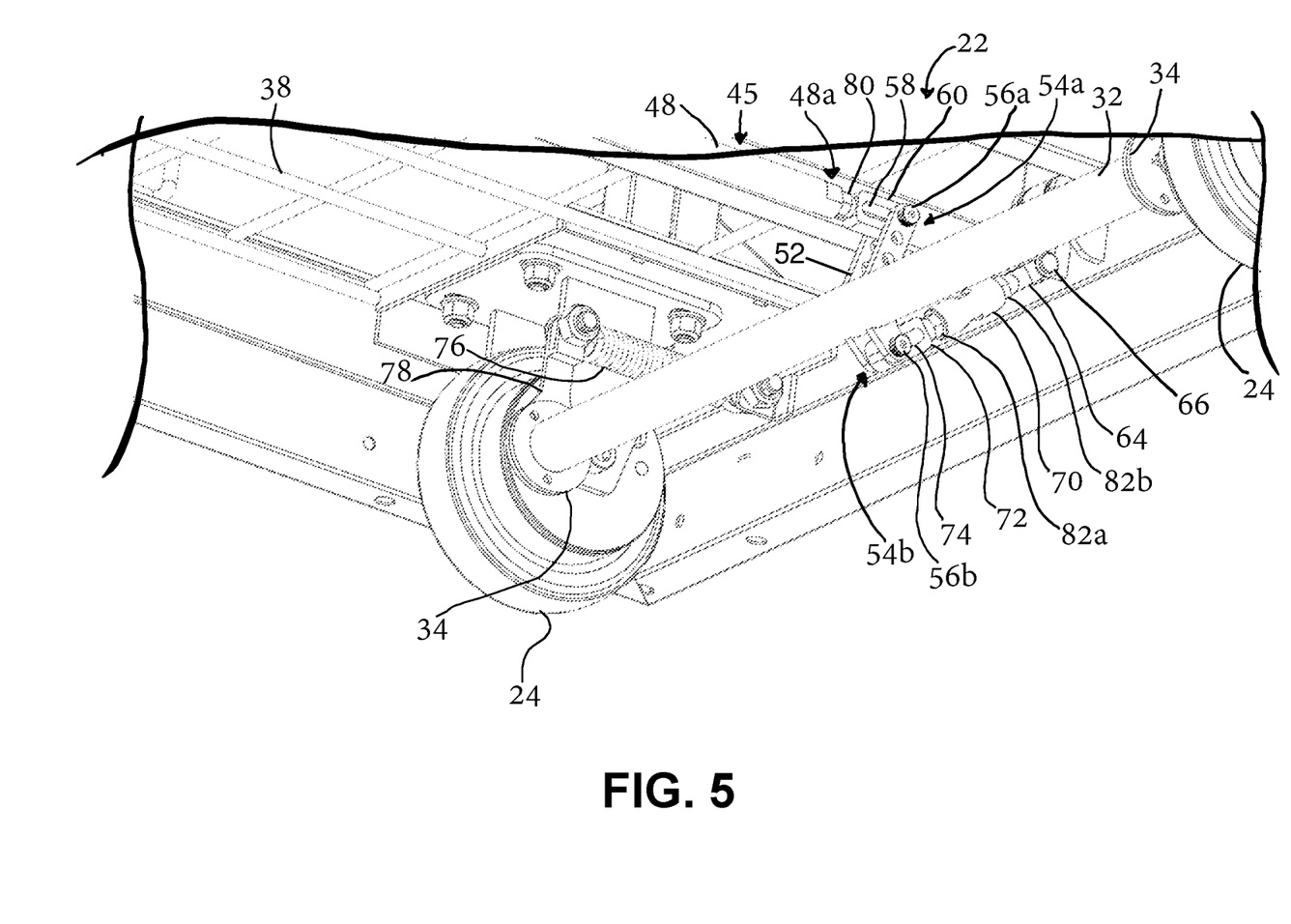
FIG. 5 is a bottom perspective view of a portion of the cart with the caster wheel brake system of FIG. 1.
Figure 6:
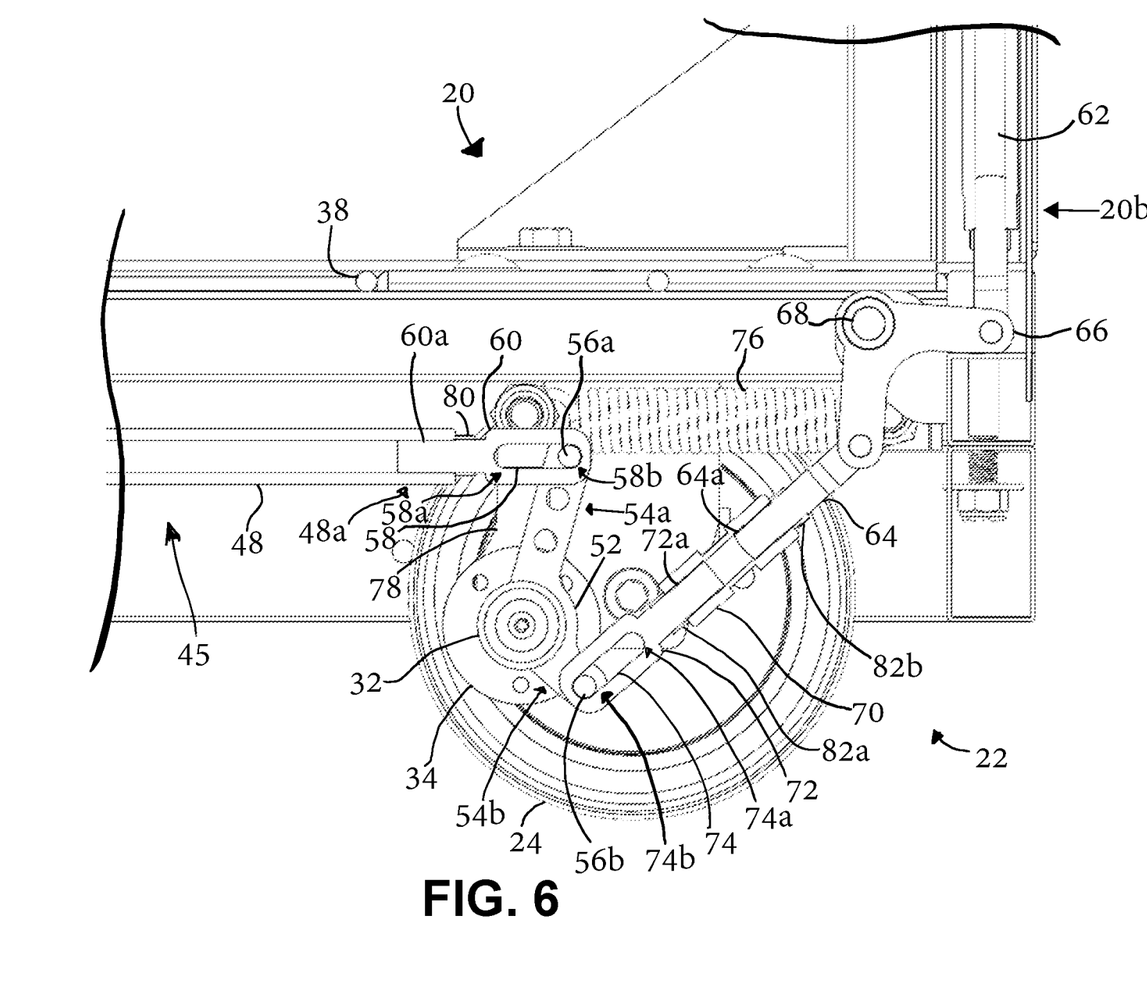
FIG. 6 is an enlarged view of the area designated VI in FIG. 3.

As shown in FIGS. 5 and 6, a multi-input rotator link in the form of dual fork linkage 52, has an integral pair of fork linkages 54a, 54b extending radially outwardly at an angle to one another. Dual fork linkage 52 couples distal brake rod 48 to brake tube 32 via a bolt 56a that extends through a pair of openings in first fork 54a, and a first slot 58 defined by a first slotted link 60. Through this series of connections, the linear retraction of distal brake rod 48 causes dual fork linkage 52 to rotate counterclockwise as viewed in FIG. 6. The rotation of dual fork linkage 52 is fixed with actuation flanges 34 via brake tube 32, thus resulting in the simultaneous rotation of dual fork linkage 52, brake tube 32, and actuation flanges 34. The rotation of actuation flanges 34 in response to the actuation of either one of brake handles 28, 30 releases a brake shoe assembly or other suitable brake inside each wheel 24 to allow wheels 24 to roll. It should be appreciated that alternative embodiments could utilize other braking mechanisms, such as a caliper brake system equipped on the outside of each wheel 24, while remaining within the spirit and scope of the present invention.

Referring once again to FIGS. 1 and 3, second brake handle 30 is U-shaped and is pivotably mounted at side wall 20b of cart 20. Second handle 30 may be rotated outward and downward from its locking position, in which handle 30 is coplanar with side wall 20b, to an unlocking position to release brake system 22. The downward rotation of second brake handle 30 causes the upward linear motion of a vertical brake rod 62, which is coupled to handle 30. As shown in FIG. 6, a lower end of vertical brake rod 62 is coupled to an angled brake rod 64 via an elbow link 66. Elbow link 66 pivots about an elbow shaft 68 such that the upward linear motion of vertical brake rod 62 causes elbow link 66 and shaft 69 to rotate counterclockwise (as viewed in FIG. 6), which in turn retracts angled brake rod 64 at an upward angle. A length-adjustment connector 70 couples angled brake rod 64 to a second slotted link 72 via internal threading on opposing ends of length-adjustment connector 70 that engage with respective threaded portions 64a and 72a on angled brake rod 64 and second slotted link 72. In this way, the retraction of angled brake rod 64 also retracts second slotted link 72.

Second slotted link 72 is connected to dual fork linkage 52 via a bolt 56b that protrudes through a pair of openings in second fork 54b, and a second slot 74 that is defined by second slotted link 72. Through this series of connections, the linear retraction of second slotted link 72 rotates dual fork linkage 52 counterclockwise. As described above, the rotation of dual fork linkage 52, counterclockwise as viewed in FIG. 6, results in the deactivation or release of the brake shoe assembly at or inside each wheel 24 to allow wheels 24 to roll. It will be appreciated that other forms of actuators may be used to rotate brake tube 32, such as a foot-operated lever or crank positioned at a less elevated location along cart 20, or more space-efficient actuators that actuate in the same plane as one of the side walls of cart 20. Furthermore, a braking system may incorporate brake cables and pulleys to transmit motion from brake handles 28, 30 to other braking components, such as actuation flanges 34.

Referring to FIGS. 4-7, a pair of resilient members, such as springs 76, are each connected to a respective yoke 78 extending from each actuation flange 34. Springs 76 exert a clockwise biasing force on actuation flanges 34 that must be overcome to rotate actuation flanges 34 counterclockwise and release brake system 22. The biasing force exerted in a clockwise direction on actuation flanges 34 by springs 76 can be overcome by the force exerted in a counterclockwise direction on actuation flanges 34 through rotating either of brake handles 28, 30, as described above.

Once either brake handle 28, 30 has been sufficiently rotated to overcome the biasing force on actuation flanges 34, there is optionally a detent mechanism equipped at each brake handle 28, 30 or at a lower portion of the brake system 22 to maintain the rotated brake handle 28 or 30 in the unlocking position until the user rotates brake handle 28 or 30 back to its locking position. The optional detent mechanisms enable brake handles 28, 30 to remain in their respective unlocking positions without the need for a user to hold on to either brake handle 28, 30. This provides users with the convenience of moving cart 20 without needing to hold either brake handle 28, 30. A user simply rotates brake handle 28 or 30—whichever is in its unlocking position—back to its locking position to overcome the detent mechanism, thereby reengaging brake system 22 and enabling cart 20 to be "parked" once again.

Figure 7:
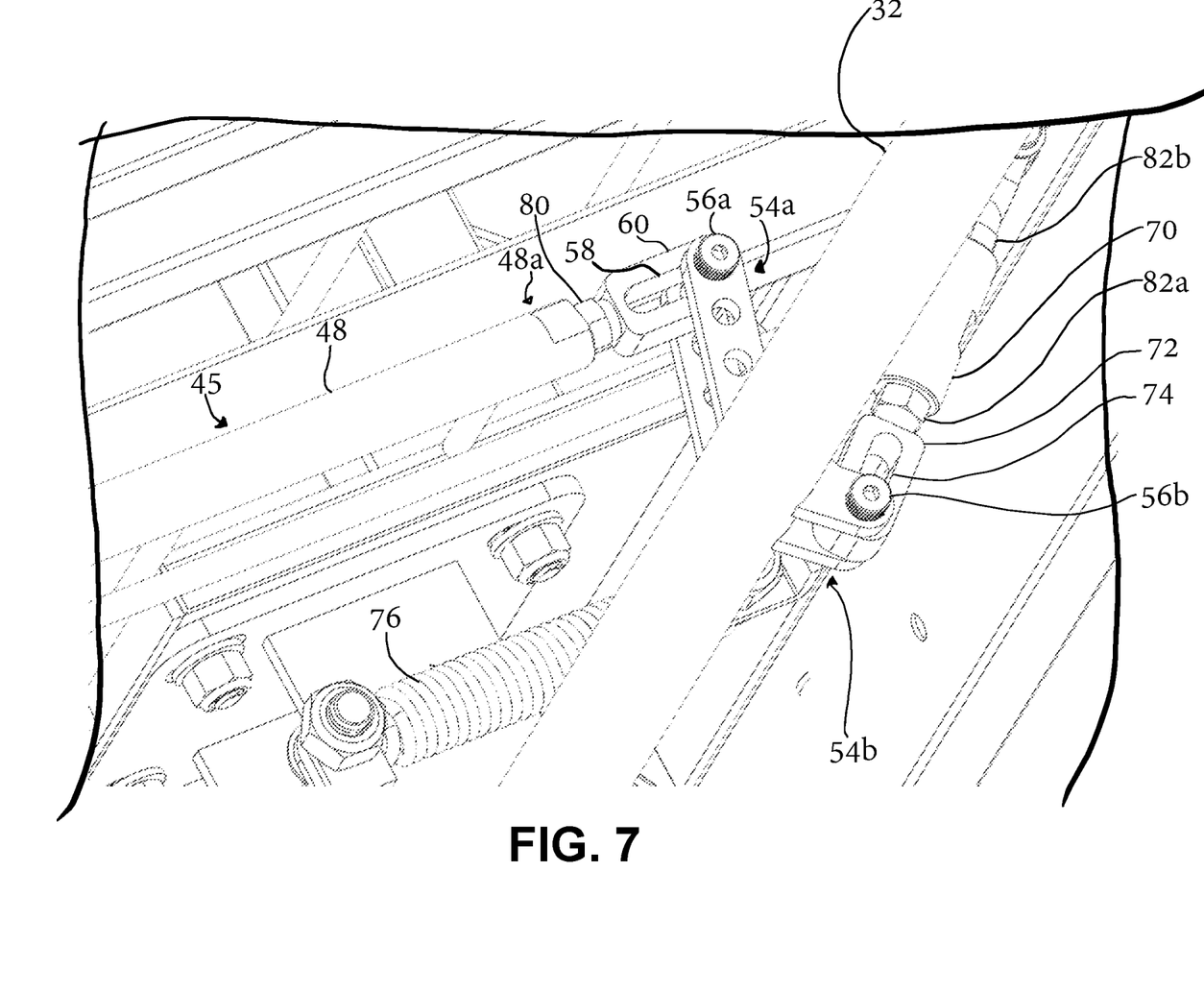
FIG. 7 is an enlarged bottom perspective view of a brake tube and forks of the cart with the caster wheel brake system.

Referring to FIGS. 6 and 7, adjustments can be made to optimize the performance of brake system 22. In one adjustment option, first slotted link 60 can be coupled to first fork 54a in alternative locations to change the angle between these components. This can be accomplished by placing bolt 56a through alternative pairs of holes defined by first fork 54a. It should be appreciated that a similar adjustment could be made between second fork 54b and second slotted link 72 in an alternative embodiment. As another adjustment option, the combined length of distal brake rod 48 and first slotted link 60 can be increased or decreased by rotating a threaded nut 80 and/or distal brake rod 48 to move a threaded shaft 60a of first slotted link 60 that protrudes into a distal end 48a of distal brake rod 48. Similarly, the combined length of angled brake rod 64, length adjustment connector 70, and second slotted link 72 can be increased or decreased through rotation of length adjustment connector 70 and/or a pair of threaded nuts 82a, 82b located at each end of length adjustment connector 70. Adjusting the above-described distances and angles changes the mechanical characteristics of brake system 22, which results in changes to the responsiveness of brake handles 28, 30 to engage and disengage brake system 22, and/or the amount of braking force that braking system 22 applies to wheels 24.

It should be appreciated that similar adjustments can be made using other structures. For example, the combined length of one or more structural components can be increased or decreased by retracting or extending a first component relative to a second component, before securing the components position relative to one another via a detent element. In a similar fashion, angles between components can be adjusted by rotating a portion of one component in a slot of another component, before securing the components at a desired angle via a detent element. Moreover, brake system 22 can be adapted for use on different sizes of carts simply by selecting proximal brake rod 44 and/or distal brake rod 48 to have shorter or longer lengths for use on shorter or longer carts, respectively, with little or no changes to other components of the brake system.

As shown in FIG. 1, another advantage of brake system 22 is the ability to rotate either brake handle 28 or 30 independently without causing the other handle to rotate. Therefore, the unused brake handle 28 or 30 can remain flush relative to the side wall 20a or 20b of cart 20 to which it is mounted. This feature allows brake system 22 to be engaged or disengaged while cart 20 is parked close to other objects to improve the overall spatial economy of a warehouse. Referring to FIG. 6, first brake handle 28 can be rotated to rotate dual fork linkage 52 in the disengagement direction, which results in the disengagement of brake system 22. During the rotation of dual fork linkage 52 in this scenario, bolt 56a remains at a distal end 58b of first slot 58 (associated with first brake handle 28), while bolt 56b slides from a distal end 74b to a proximal end 74a of second slot 74 such that the rotational motion of dual fork linkage 52 is not transferred into linear motion of second slotted link 72. As a result, motion generated from rotating first brake handle 28 is not transferred to second brake handle 30. Likewise, rotation in the disengagement direction of dual fork linkage 52 caused by pivoting second brake handle 30 will not cause first brake handle 28 to pivot. During the rotation of dual fork linkage 52 in this scenario, bolt 56b remains at distal end 74b of second slot 74 (associated with second brake handle 30), while bolt 56a slides from distal end 58b to a proximal end 58a of first slot 58. As a result, motion imparted to dual fork linkage 52 by second brake handle 30 is not transferred to first brake handle 28.

Accordingly, the caster wheel brake system of the present invention has two actuable handles that may be independently operated to disengage one or more brakes in proximity to a pair of caster wheels. Using either handle to disengage the one or more brakes does not move the other handle. This allows a user greater flexibility in using the brake system while also improving the overall ability to save space in a warehouse that utilizes carts or other similar wheeled structures.

Changes and modifications in the specifically described embodiments may be carried out without departing from the principles of the present invention, which is intended to be limited only by the scope of the appended claims, as interpreted according to the principles of patent law including the doctrine of equivalents.

The embodiments of the invention in which an exclusive property or privilege is claimed are defined as follows:

1. A caster wheel brake system comprising:
a caster wheel assembly configured for mounting to a mobile support, said caster wheel assembly comprising a wheel;
first and second handles configured to be coupled to the mobile support in a spaced arrangement and each movable from a respective locking position to a respective unlocking position;
a rotator link coupled to said first and second handles and configured to rotate when either of said first and second handles is moved between its respective locking and unlocking positions, wherein said rotator link comprises first and second fork linkages coupled to said first and second handles, respectively;
a brake-actuating link coupling said rotator link to a brake associated with said wheel;
a slotted link defining a slot, said slotted link slidably coupling said second handle to said rotator link;
wherein moving said first handle to its unlocking position urges a portion of said rotator link to slide within said slot;
wherein movement of either of said first and second handles from its respective locking position to its respective unlocking position rotates said rotator link and said brake-actuating link in a disengagement direction; and
wherein rotation of said brake-actuating link in the disengagement direction urges the brake out of a braking position that limits or prevents rotation of said wheel, to a released position that permits rotation of said wheel.

2. The system of claim 1, wherein said first and second handles are configured to be coupled to opposing sides of the mobile support.

3. The system of claim 1, wherein moving said first handle to its unlocking position does not move said second handle.

4. The system of claim 1, further comprising a resilient member coupled to said brake-actuating link and configured to bias said brake-actuating link in a rotational direction opposite the disengagement direction.

5. The system of claim 1, wherein said first handle is configured to pivot about a vertical axis between its locking and unlocking positions, and wherein said second handle is configured to pivot about a horizontal axis between its locking and unlocking positions.

6. The system of claim 1, wherein said first and second handles are configured to be coupled to respective upright outer sides of the mobile support, and wherein each of said first and second handles is configured to be oriented parallel to the respective upright outer side when in its respective locking position.

7. The system of claim 1, wherein said slotted link comprises a second slotted link and said slot comprises a second slot, said system further comprising a first slotted link defining a first slot, wherein said first slotted link slidably couples said first handle to said rotator link.

8. The system of claim 1, in combination with said mobile support.

9. A caster wheel brake system comprising:
a caster wheel assembly configured for mounting to a mobile support, said caster wheel assembly comprising a wheel;
first and second handles configured to be coupled to the mobile support in a spaced arrangement and each movable from a respective locking position to a respective unlocking position;
a rotator link coupled to said first and second handles and configured to rotate when either of said first and second handles is moved between its respective locking and unlocking positions; and
a brake-actuating link coupling said rotator link to a brake associated with said wheel;
a first slotted link defining a first slot, and a second slotted link defining a second slot, wherein said first slotted link slidably couples said first handle to said rotator link, and said second slotted link slidably couples said second handle to said rotator link;
wherein movement of either of said first and second handles from its respective locking position to its respective unlocking position rotates said rotator link and said brake-actuating link in a disengagement direction;
wherein rotation of said brake-actuating link in the disengagement direction urges the brake out of a braking position that limits or prevents rotation of said wheel, to a released position that permits rotation of said wheel; and
wherein said first and second handles are configured to be coupled to respective upright outer sides of the mobile support, and said first and second handles are configured to be oriented parallel to the respective upright outer sides when in their respective locking positions.

10. The system of claim 9, wherein said rotator link comprises first and second fork linkages coupled to said first and second handles, respectively.

11. The system of claim 9, in combination with said mobile support, wherein said upright outer sides are located on opposing sides of said mobile support.

12. A caster wheel brake system comprising:
a caster wheel assembly configured for mounting to a mobile support, said caster wheel assembly comprising a wheel;
first and second handles configured to be coupled to the mobile support in a spaced arrangement and each movable from a respective locking position to a respective unlocking position;
a rotator link coupled to said first and second handles and configured to rotate when either of said first and second handles is moved between its respective locking and unlocking positions;
a first slotted link defining a first slot, and a second slotted link defining a second slot, wherein said first slotted link slidably couples said first handle to said rotator link, and said second slotted link slidably couples said second handle to said rotator link; and
a brake-actuating link coupling said rotator link to a brake associated with said wheel;
wherein movement of either of said first and second handles from its respective locking position to its respective unlocking position rotates said rotator link and said brake-actuating link in a disengagement direction;
wherein rotation of said brake-actuating link in the disengagement direction urges the brake out of a braking position that limits or prevents rotation of said wheel, to a released position that permits rotation of said wheel; and
wherein moving said first handle from its locking position to its unlocking position urges a portion of said rotator link to slide within said second slot without urging said rotator link to slide within said first slot, and wherein moving said second handle from its locking position to its unlocking position urges a portion of said rotator link to slide within said first slot without urging said rotator link to slide within said second slot.

13. The system of claim 12, in combination with said mobile support.

14. A caster wheel brake system comprising:
a caster wheel assembly configured for mounting to a mobile support, said caster wheel assembly comprising a wheel;
first and second handles configured to be coupled to opposing upright outer sides of the mobile support and each movable from a respective locking position to a respective unlocking position;
a rotator link coupled to said first and second handles and configured to rotate when either of said first and second handles is moved between its respective locking and unlocking positions;
a brake-actuating link coupling said rotator link to a brake associated with said wheel;
a first slotted link defining a first slot, and a second slotted link defining a second slot;
wherein said first slotted link slidably couples said first handle to said rotator link, and said second slotted link slidably couples said second handle to said rotator link;
wherein movement of either of said first and second handles from its respective locking position to its respective unlocking position rotates said rotator link and said brake-actuating link in a disengagement direction;
wherein rotation of said brake-actuating link in the disengagement direction urges the brake out of a braking position that limits or prevents rotation of said wheel, to a released position that permits rotation of said wheel;
wherein said first and second handles are movable independently of one another; and
wherein said first and second handles are configured to be oriented parallel to the respective upright outer side when in their respective locking positions.

15. The system of claim 14, further comprising a resilient member coupled to said brake-actuating link and configured to bias said brake-actuating link in a rotational direction opposite the disengagement direction.

16. The system of claim 14, wherein moving said first handle from its locking position to its unlocking position urges a portion of said rotator link to slide within said second slot without urging said rotator link to slide within said first slot, and wherein moving said second handle from its locking position to its unlocking position urges a portion of said rotator link to slide within said first slot without urging said rotator link to slide within said second slot.

17. The system of claim 16, wherein said rotator link comprises first and second fork linkages coupled to said first and second slotted links, respectively.

18. The system of claim 14, in combination with said mobile support.

19. A caster wheel brake system comprising:
a caster wheel assembly configured for mounting to a mobile support, said caster wheel assembly comprising a wheel;
first and second handles coupled to opposing upright outer sides of the mobile support and each movable from a respective locking position to a respective unlocking position;
a longitudinal brake rod coupled to said first handle and configured to move longitudinally when said first handle moves between its locking and unlocking positions;
a vertical brake rod coupled to said second handle and configured to move vertically when said second handle moves between its locking and unlocking positions;
a rotator link coupled to said longitudinal brake rod and to said vertical brake rod, and configured to rotate when said longitudinal brake rod moves longitudinally or when said vertical brake rod moves vertically; and
a brake-actuating link coupling said rotator link to a brake associated with said wheel;
wherein movement of said first actuating link from its locking position to its unlocking position longitudinally moves said longitudinal brake rod to rotate said rotator link and said brake-actuating link in a disengagement direction;
wherein movement of said second actuating link from its locking position to its unlocking position vertically moves said vertical brake rod relative to said brake-actuating link, and rotates said rotator link and said brake-actuating link in the disengagement direction;
wherein rotation of said brake-actuating link in the disengagement direction urges the brake out of a braking position that limits or prevents rotation of said wheel, to a released position that permits rotation of said wheel; and
wherein said first and second handles are moveable independently of one another.

20. The system of claim 19, wherein said longitudinal brake rod comprises a proximal brake rod and a distal brake rod that are coupled together by a center support arm, and wherein said center support arm is pivotally attached to the mobile support.

21. The system of claim 20, further comprising a first slotted link defining a first slot, and a second slotted link defining a second slot, wherein said first slotted link slidably couples said longitudinal brake rod to said rotator link, and wherein said second slotted link slidably couples said vertical brake rod to said rotator link.

* * * * *